United States Patent [19]
Johnson et al.

[11] 4,114,279
[45] Sep. 19, 1978

[54] TIRE CORRECTION SYSTEM

[76] Inventors: Winston O. Johnson, 3379 Aztec Rd., 22D, Doraville, Ga. 30084; Jerry A. Crabb, 320 White Oak Dr., Buford, Ga. 30518

[21] Appl. No.: 737,018

[22] Filed: Oct. 29, 1976

[51] Int. Cl.² .................... G01B 5/08; G01M 17/02
[52] U.S. Cl. .................................... 33/178 R; 73/146
[58] Field of Search ............ 33/143 D, 147 H, 147 F, 33/147 T, 178 R, 178 D, 203, 203.18; 73/146

[56] References Cited

U.S. PATENT DOCUMENTS

| | | | |
|---|---|---|---|
| 1,888,416 | 11/1932 | Williams | 33/178 R |
| 2,087,896 | 7/1937 | Blomstrom | 33/178 R |
| 2,526,056 | 10/1950 | Weston | 33/178 R |
| 2,841,874 | 7/1958 | Richardson | 33/143 D |
| 3,213,543 | 10/1965 | Masuda | 33/147 T |
| 3,783,523 | 1/1974 | Smith | 33/143 D |

OTHER PUBLICATIONS

Meadows, John J., "Indicating Gages Sort Mixed Parts", American Machinist, Nov. 17, 1949, p. 95.

*Primary Examiner*—Richard E. Aegerter
*Assistant Examiner*—Richard R. Stearns
*Attorney, Agent, or Firm*—B. J. Powell

[57] ABSTRACT

A method of increasing tire life of paired vehicular tires by measuring a plurality of mounted and inflated pneumatic tires to provide an indication of the tread diameter and/or circumference length of each tire with an indicated accuracy of at least about 0.020 inch on diameter or at least about 0.062 inch on circumference length and then selecting a pair of the measured tires whose indication of tread diameter differs by no more than about 0.040 inch or whose indication of circumference length differs by no more than about 0.125 inch for mounting on the vehicle as a matched pair. The invention also encompasses the apparatus for making such measurements.

7 Claims, 6 Drawing Figures

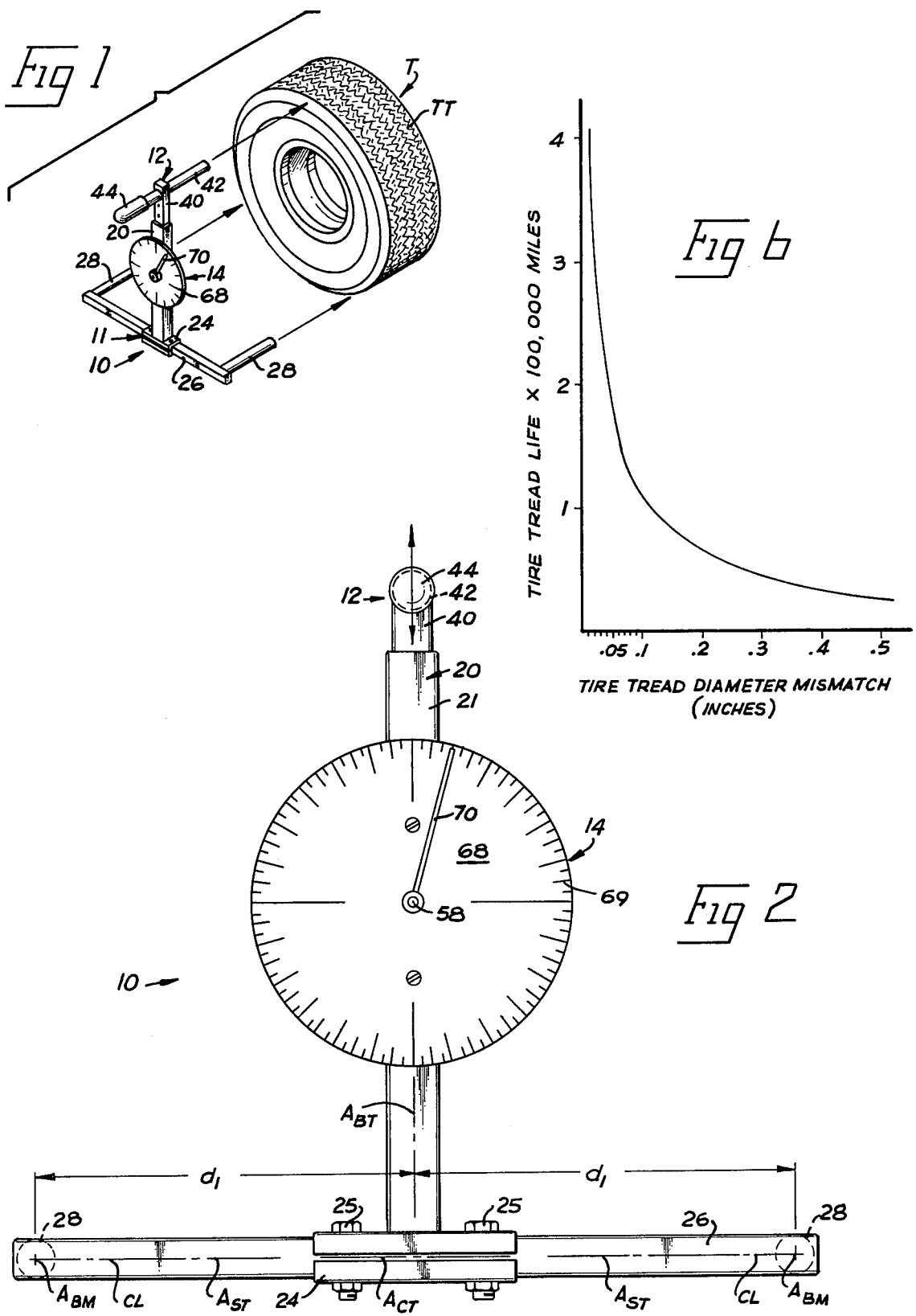

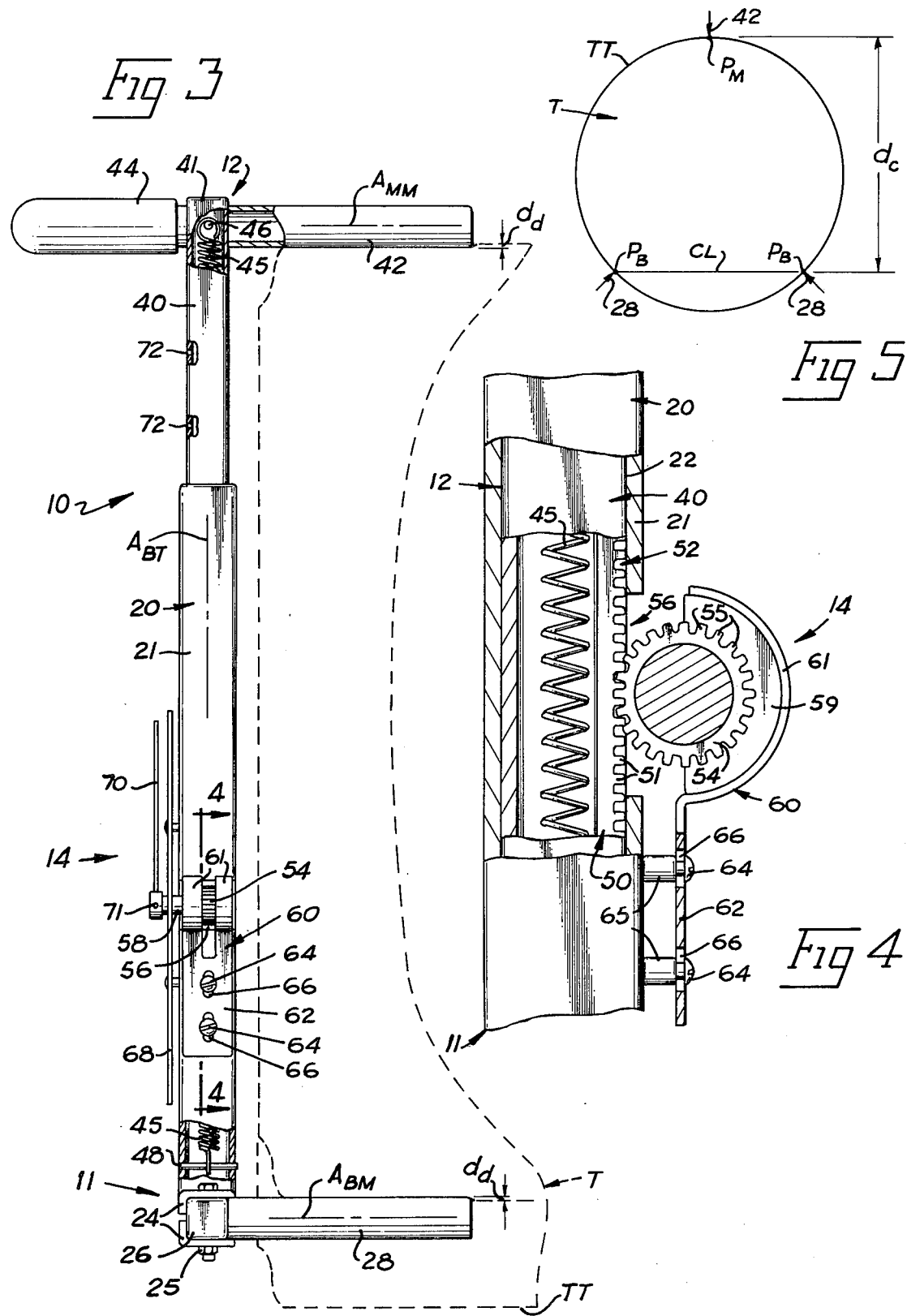

TIRE CORRECTION SYSTEM

BACKGROUND OF THE INVENTION

This invention relates generally to techniques for significantly increasing the tread life of matched pairs of vehicular tires and more particularly to techniques for increasing the tread life of matched pairs of vehicular tires by matching the effective tread diameters of the vehicular tires of the matched pair.

When vehicular tires are used in pairs such as the dual wheels on trucks and trailers they are commonly called "duals". The tread life of these duals is significantly affected by the difference in the diameter of the tire treads of the duals and is commonly referred to in the industry as tire mismatch. Since the circumferential length of the tire treads is a direct function of the tread diameter, one of the tire treads of the mismatched pair microscopically slides along the rolling surface over which the duals are moving. This mismatch causes rapid wearing away of the tire tread of one of the duals, usually the smaller diameter tire tread, which not only reduces the tread life of the tire tread that is constantly sliding on the road surface but also on the tire tread of the other tire of the matched pair.

Various attempts have been made to more accurately match the tires of duals by measuring the circumference of the tire tread. While this technique has increased effective tire tread life, the lack of accuracy of such measurement has prevented the achievement of the desirable tire tread life in the matched pair of tires. Secondly, this prior art technique has also depended on the skill of the operator in determining the effective tire tread circumferential length which has resulted in significant variance in the tire tread life when the matching of the matched pair of tires was attempted.

SUMMARY OF THE INVENTION

These and other problems and disadvantages associated with the prior art are overcome by the invention disclosed herein by providing a technique for matching the tires of a matched pair to greatly increase the tire tread life of the matched pair. Further, the invention provides apparatus for accurately measuring the effective tread diameter mismatch of the tires with a sufficient repeatability, not dependent on the ability of the operator, to insure selection of properly matched tires for the dual. The invention is able to provide a useful tire life of excess of 300,000 miles. Other advantages produced by the invention is increased tire life due to the reduction of tire surface temperature, reduced trailer drag, and improved fuel consumption as a result of the reduced sliding of the tire tread.

The method of the invention includes the step of measuring mounted and inflated pneumatic tires to be used as duals to provide an indication of the tread diameter of each tire within an indicated accuracy of at least 0.020 inch and selecting a pair of measured tires whose indication of tread diameter differs by no more than 0.040 inch for mounting on a vehicle as a dual. This indication of tread diameter provides an indication of the tire tread circumference within an indicated accuracy of at least 0.062 inch so that the selected pair of measured tires differs in indication of tread circumference by no more than 0.125 inch. The method includes obtaining the indication of tire tread diameter and/or circumferential tire tread length using three spaced points on the tire tread by measuring the perpendicular distance between a fixed length chord joining two of the spaced points and the third point on the tire tread the farthest from the chord within an accuracy of at least 0.010 inch. The method also includes measuring the tire tread while the three measuring points are under simulated vehicular load. Out-of-roundness of the tire tread can be indicated by taking measurements of circumferentially shifted positions.

The apparatus of the invention includes a base assembly with a pair of spaced apart base tire tread engaging members for simultaneously engaging the tire tread at two spaced apart positions so that the chord line joining the base tire tread engaging members extends along a chord of the tire tread, and a movable assembly which is movably carried by the base assembly with a movable tire tread engaging member movable with respect to the base assembly along a path centered between the two base tire tread engaging members and perpendicular to the chord line joining the two base tire tread engaging members. An indicator mechanism operatively interconnects the movable assembly with the base assembly to quantify the distance between the chord line joining the base tire tread engaging members and the movable tire tread engaging member within an accuracy of 0.010 inch.

These and other features and advantages of the invention disclosed herein will become more clearly understood upon consideration of the following specification and accompanying drawings wherein like characters of reference designate corresponding parts throughout the several views and in which:

BRIEF DESCRIPTION OF THE DRAWINGS

FIG. 1 is an exploded perspective view illustrating the apparatus of the invention ready for use;

FIG. 2 is an enlarged front elevational view of the apparatus of the invention shown in FIG. 1;

FIG. 3 is an enlarged side elevational view of the apparatus of the invention of FIG. 1;

FIG. 4 is an enlarged cross-sectional view taken generally along the line 4—4 in FIG. 3;

FIG. 5 is a schematic view illustrating the operation of the invention; and,

FIG. 6 is a graph illustrating the effect of the tire tread diameter mismatch versus tire tread life.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENT

Referring to FIGS. 1–4, it will be seen that the measuring device 10 comprises a base assembly 11 and a movable assembly 12 which is movably carried by the base assembly 11. An indicator mechanism 14 interconnects the movable assembly 12 with the base assembly 11 to quantify the movement of the movable assembly 12 with respect to the base assembly 11.

The base assembly 11 includes an upstanding base tube 20 generally square in cross-section with a seamless tube side wall 21 that defines a slide passage 22 therethrough about the base tube central axis $A_{BT}$ as will become more apparent. The lower end of the base tube 20 mounts one side of a split cross tube 24 which is held together by fasteners 25 so that the cross tube central axis $A_{CT}$ is perpendicular to the base tube central axis $A_{BT}$. The split cross tube 24 also has a generally square cross-sectional shape and removably mounts a side tube 26 therein which extends out on opposite sides of the split cross tube 24 so that the side tube axis $A_{ST}$ lies along the cross tube axis $A_{CT}$. The side tube 26 also has a generally square cross-sectional shape complimentary to that of the split cross tube 24 so that the relative position between the split cross tube 24 and the side tube 26 is fixed. The fasteners 25 extend through the side tube 26 to positively locate the side tube 26 with respect to the split cross tube 24 and the base tube 20. Each opposite end of the side tube 26 mounts a base tire tread engaging member 28 with a circular cross-sectional shape and having a central axis $A_{BM}$ which is perpendicular to both the base tube axis $A_{BT}$ and the cross tube axis $A_{CT}$. It will be noted that the base tire tread engaging members 28 extend rearwardly from the side tube 26. The axis $A_{BM}$ of each of the base tire tread engaging members 28 is located the same distance $d_1$ outboard of the base tube central axis $A_{BT}$ seen in FIG. 2.

The movable assembly 12 includes a slide tube 40 having a generally square cross-sectional shape that is slidably received in the slide passage 22 in the base tube 20 so that the slide tube 40 is movable axially along and centered on the base tube central axis $A_{BT}$. The upper end 41 of the slide tube 40 projects above the upper end of the base tube 20 and is provided with a movable tire tread engaging member 42 with a circular cross-sectional shape having a central axis $A_{MM}$ which extends rearwardly from the slide tube 40 with the axis $A_{MM}$ oriented perpendicular to both the base tube axis $A_{BT}$ and the side tube axis $A_{ST}$ and parallel to the base member axis $A_{BM}$. The base tire tread engaging members 28 and the movable tire tread engaging member 42 are sufficiently long to extend over a significant portion of the width of the tire tread while the base tube 20, split cross tube 24 and side tube 26 extend in front of the tire as seen in FIG. 3. A handle 44 is also provided at the upper end 41 of the slide tube 40 which extends forwardly of the slide tube 40 to be manually engaged to place the measuring device 10 on the tire.

The slide tube 40 is urged into the base tube 20 by a coil spring 45 pinned to the upper end 41 of the slide tube 40 by a cross pin 46 and pinned to the base tube 20 just above the split cross tube 24 by a cross pin 48. The coil spring 45 is best seen in FIG. 3 and is positioned inside the slide tube 40 and the base tube 20. When the measuring device 10 is placed on the tire T as seen in FIG. 3 with the base tire tread engaging members 28 and the movable tire tread engaging member 42 engaging the tire tread T at three spaced points, the coil spring 45 serves to load the tire tread TT at its point of contact with the members 28 and 42 with a force of about 100 psi corresponding generally to the load applied to the tire tread TT by the weight of the vehicle. This causes the tire tread engaging members 28 and 42 to deflect the tire tread the distance $d_d$ seen in FIG. 3. This not only assures the accuracy of the measurement being taken since the tire tread TT is loaded at approximately the same load during each measurement but also insures that the measurement taken is representative of the actual loaded tire tread diameter when the tire is on the vehicle. Thus, to place the device 10 on the tire, the operator hooks the base members 28 under the tire tread TT, pulls up on handle 44, and hooks the movable member 42 over the tire tread. Because the spring 45 holds the device on the tire, the operator can release the handle and make the reading.

The indicator mechanism 14 interconnects the base tube 20 and the slide tube 40 to quantify the relative movement of the slide tube 40 with respect to the base tube 20. As best seen in FIGS. 3 and 4, the indicator mechanism 14 includes a rack 50 with gear teeth 51 thereon that extend through an appropriate opening 52 in the side of the slide tube 40 as best seen in FIG. 4 so that the gear teeth 51 are flush with the outside of the slide tube 40. A spur gear 54 with gear teeth 55 thereon is positioned beside the base tube 20 and projects through an opening 56 in the tube side wall 21 so that the gear teeth 55 on the spur gear 54 mesh with the gear teeth 51 on the rack 50. The spur gear 54 is mounted on a gear shaft 58 with the gear shaft 58 being rotatably journalled by a pair of semi-circular bearing members 59. The bearing members 59 are carried in a resilient bearing support 60 having a pair of semi-circular tangs 61 that extend around the bearing members 59 so that the bearing members 59 and the tangs 61 on the bearing support 60 serve to keep the spur gear 54 laterally centered on the rack 50. The bearing support 60 also includes a support section 62 attached to the side of the tube side wall 21 as seen in FIG. 4 with appropriate fasteners 64 and spacers 65 through elongated adjustment slots 66 in the support section 62 of the bearing support 60. The resiliency of the bearing support 60 is such that the spur gear 54 is urged toward engagement with the rack 50 with the rack 50 providing the reactive force to hold the spur gear 54 in position. The gear shaft 58 extends forwardly of the base tube 20 through an indicator dial 68 subdivided with appropriate indicia 69 along its peripheral edge. The end of the gear shaft 58 projecting forwardly of the indicator dial 68 has a pointer 70 pinned thereto with pin 71 seen in FIG. 3 so that rotational movement of the gear shaft 58 rotates the pointer 70 about the face of the indicator dial 68 with the indicia 69 quantifying the movement of the pointer 70 about the dial 68. This arrangement is sized to provide a significant multiplication of the indicated movement of the slide tube 40 with respect to the base tube 20 over that which actually occurs. The particular ratio selected is a multiplication factor of 26. While the indicia on the dial 68 may be changed to reflect different movements of the slide tube 40 with respect to the base tube 20, the particular indicia illustrated in FIG. 2 has one division on the indicator dial corresponding to a relative movement between the slide tube 40 and the base tube 20 of about 0.009 inch (0.2 mm). Because the pointer 70 can rotate more than one revolution, indicator holes 72 seen in FIG. 3 in the slide tube 40 allow the number of revolutions made to be quantified by the number of holes 72 exposed above the top of base tube 20. Thus, the indication of diameter is at least about 0.020 inch (usually about 0.010 inch) and the indication of circumference length is at least about 0.062 inch (usually about 0.031 inch).

Referring to FIG. 5, it will be seen that the base tire engaging members 28 will engage the tire tread at two spaced apart base points $P_B$ which, when joined by chord line CL, causes the chord line CL to lie along a chord of the tire tread TT. The movable tire tread engaging member 42 engages the tire tread at a movable point $P_M$ which is circumferentially spaced around the tire tread equal distances from both base points $P_B$ so that the movable point $P_M$ is that point of the tire tread TT which is the farthest from chord line CL as seen in FIG. 5. The measurement indicated on the dial 68 by the pointer 70 is thus the perpendicular distance $d_c$ between the chord line CL and the movable point $P_M$ as seen in FIG. 5. While this indicated distance is not the true tire diameter nor is it the true tire circumferential length, the tires T are simply matched by matching the readings indicated by the indicator mechanism 14 which serves the same purpose. The actual measurement used to make the selection of the matched tires is relatively immaterial as long as the measurement taken is some indication of the tire tread diameter and/or its circumferential length. By taking a similar measurement at circumferential shifted positions, the out-of-roundness of the tire tread can also be indicated.

Once the measurements are made with the measuring device 10, the tires of each pair to be matched are selected so that their distance $d_c$ or tire tread diameter varies minimally, e.g., by no more than about 0.040 inch or where their tire tread circumference differs by no more than about 0.125 inch. Referring to FIG. 6, it will be seen that the limiting of this mismatch to the above range serves to increase the tire tread life to at least about 300,000 miles and usually within the neighborhood of about 400,000. The best tire tread life that has been obtained with the prior art tire matching technique is about 150,000.

While specific embodiments of the invention have been disclosed herein, it is to be understood that full use may be made of modifications, substitutions and equivalents without departing from the scope of the inventive concept as disclosed herein.

We claim:

1. A device for measuring inflated vehicular tires to provide a reading indicative of tire tread diameter and/or circumference length comprising:
   contact means for contacting the tire tread at three circumferentially spaced points on the tire tread;
   loading means for applying a load per unit area to the tire tread through said contact means which is approximately the actual load per unit area to which the tire is subjected during actual use; and,
   indicator means for indicating the distance between some point on a line joining two of said spaced points and the other of said spaced points.

2. The device of claim 1 wherein said contact means includes:
   a base assembly including a pair of spaced apart base tire tread engaging members for simultaneously engaging the tire tread at two spaced apart positions so that a chord line joining said base tire tread engaging members extends along a chord of the tire tread when said base tire tread engaging members engage the tire tread, and
   a movable assembly movably carried by said base assembly including a movable tire tread engaging member movable with respect to said base assembly along a prescribed path toward and away from said chord line for engagement with a third position on the tire tread opposite said chord line; and,
   wherein said indicator means operatively interconnects said base assembly and said movable assembly to quantify the distance between the chord line and said movable tire tread engaging member.

3. The device of claim 2 wherein said movable tire tread engaging member is movable with respect to said base assembly along a prescribed path perpendicular to said chord line and equadistant between said base tire engaging members.

4. The device of claim 3 wherein said base assembly includes a base member having a base central axis and a side member fixedly mounted to one end of said base member about a side central axis perpendicular to the base central axis, said base tire tread engaging members fixedly mounted on opposite ends of said side member and each defining a base member central axis which is oriented perpendicular to both said side central axis and said base central axis, each of said base member central axes located equidistance from said base central axis; and wherein said movable assembly includes a slide member slidably carried by said base member so that said slide member is axially movable along said base central axis toward and away from said chord line joining said base tire tread engaging members, said movable tire tread engaging member carried by said slide member about a movable member axis oriented normal to said base central axis and said side central axis and parallel to said base member central axes.

5. The device of claim 4 wherein said loading means includes a spring connecting said base member and said slide member for forcing said movable tire tread engaging member toward said spaced apart base tire tread engaging members to cause said base tire tread engaging members and said movable tire tread engaging member to forcably engage the tire tread with a prescribed load per unit area of about 100 pounds per square inch.

6. The device of claim 4 wherein said indicator means includes a gear rack carried by and movable with said slide member, a spur gear rotatably mounted about a spur gear rotational axis generally normal to said base central axis and axially fixed with respect to said base central axis so that said spur gear meshes with and is rotated by said rack as said slide member axially moves with respect to said base member, a pointer member connected to said spur gear for rotation of said pointer member about said spur gear rotational axis as said spur gear is rotated by said rack, an indicator dial member operatively associated with said pointer and fixed relative to said base member so that said pointer rotates about said dial member, and indicia on said dial member to quantify the relative movement of said pointer with respect to said dial member.

7. A method of matching paired vehicular tires to reduce the wear thereon and increase the tread life thereof comprising the steps of:
   measuring the tread diameter of a plurality of tires, each mounted on a wheel rim and inflated, by measuring the perpendicular distance between a fixed length chord joining two spaced points on each tire tread and that point on each tire tread the farthest from the chord wherein the points joined by the chord and the farthest point on the tire tread are applying loads per unit area to the tire tread while the measuring step is performed simulating the actual loads per unit area applied to the tire tread when the tire is in actual use;
   selecting a pair of the measured tires so that the perpendicular distances between the chord and the farthest point on the tire tread thereof differs by no more than 0.040 inch (1.02 mm); and
   mounting the selected pair of tires on a vehicle as a dual pair so that microscopic sliding of the dual pair tire treads is reduced.

* * * * *